US012020633B2

(12) United States Patent
Yeo

(10) Patent No.: US 12,020,633 B2
(45) Date of Patent: Jun. 25, 2024

(54) DISPLAY DRIVING DEVICE AND METHOD FOR DETERMINING ERROR OF SOURCE AMPLIFIER IN DISPLAY DRIVING DEVICE

(71) Applicant: LX Semicon Co., Ltd., Daejeon (KR)

(72) Inventor: Sung Dae Yeo, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/194,137

(22) Filed: Mar. 31, 2023

(65) Prior Publication Data

US 2024/0038144 A1 Feb. 1, 2024

(30) Foreign Application Priority Data

Aug. 1, 2022 (KR) ........................ 10-2022-0095521

(51) Int. Cl.
*G09G 3/3291* (2016.01)
*G09G 3/32* (2016.01)

(52) U.S. Cl.
CPC ............ *G09G 3/32* (2013.01); *G09G 3/3291* (2013.01); *G09G 2300/0814* (2013.01); *G09G 2310/027* (2013.01); *G09G 2310/0291* (2013.01); *G09G 2310/08* (2013.01); *G09G 2330/08* (2013.01); *G09G 2330/12* (2013.01)

(58) Field of Classification Search
CPC ...... G09G 3/32; G09G 3/3291; G09G 3/3266; G09G 3/3285; G09G 3/006; G09G 2310/0291
See application file for complete search history.

(56) References Cited

U.S. PATENT DOCUMENTS 7,432,904 B2 10/2008 Kang
8,102,355 B2 * 1/2012 Woo ..................... G09G 3/3688 345/96
8,810,268 B2 * 8/2014 Huang ................. G09G 3/3685 324/760.02

FOREIGN PATENT DOCUMENTS

KR 10-1133486 B1 7/2012

* cited by examiner

*Primary Examiner* — Sardis F Azongha
(74) *Attorney, Agent, or Firm* — POLSINELLI PC

(57) ABSTRACT

An aspect relates to a display driving device and a method for determining an error of a source amplifier in a display driving device, and determines whether an output buffer (e.g., a source amplifier) provided at an output stage of a display driving device providing data voltage to each pixel (e.g., subpixel) of a display panel has an error to prevent a phenomenon in which a screen is not normally displayed.

20 Claims, 13 Drawing Sheets

DISPLAY DRIVING DEVICE AND METHOD FOR DETERMINING ERROR OF SOURCE AMPLIFIER IN DISPLAY DRIVING DEVICE

CROSS-REFERENCE TO RELATED APPLICATION

This application claims the priority of Korean Patent Application No. 10-2022-0095521, filed on Aug. 1, 2022, which is hereby incorporated by reference in its entirety.

BACKGROUND

Field of the Disclosure

The present disclosure relates to a display driving device and a method for determining an error of a source amplifier in the display driving device.

Description of the Background

As information progresses, various display devices that may visualize information are being developed. A liquid crystal display (LCD), an organic light emitting diode (OLED) display device, a plasma display panel (PDP) display device, etc., are display devices which have been developed up to recently or are being developed. The display devices are developed to appropriately display high-resolution images.

Meanwhile, there may be various schemes of driving a display panel disposed a light emitting diode (LED), and as representative schemes, there are a pulse amplitude modulation (PAM) scheme and a pulse width modulation (PWM) scheme. The PAM scheme is a scheme that supplies analog voltage corresponding to a gray value of a pixel to a pixel, and differently controls a magnitude of current which flows to the pixel according to the analog voltage. The PWM scheme is a scheme that adjusts a time of the current supplied to the pixel according to the gray value of the pixel.

As an example, the display panel may include multiple pixels, and the light emitting diode emits according to current which flows on the light emitting diode (e.g., LED) included in each pixel to display a desired image.

In various aspects, each pixel (e.g., subpixel) of the display panel may receive data voltage for driving the display driving device. To this end, an output buffer (e.g., source amplifier) may be provided on an output stage of the display driving device. The output buffer may be connected to a data line of each pixel (e.g., subpixel) through a channel circuit. For example, data voltage (or driving voltage) output from each output buffer may be supplied to the corresponding pixel through the data line.

Meanwhile, when the error occurs in each output buffer (e. g., source amplifier), normal data voltage cannot be provided to the relevant pixel (e. g., subpixel), a screen may not be normally displayed. Therefore, the development of a technology that may check the error of each output buffer included in the display driving device and repair the checked error is required.

The description in this section is only to provide background information and do not constitute an admission of prior art.

SUMMARY

Accordingly, the present disclosure is directed to a display driving device and a method for determining an error of a source amplifier in the display driving device that substantially obviate one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to provide a display driving device and a method for determining an error of a source amplifier in a display driving device, which sequentially compare output voltage (e. g., data voltage) of an output buffer (e. g., source amplifier) corresponding to each pixel (e. g., subpixel) and reference voltage to check an error of the output buffer.

The present disclosure is also to provide a display driving device and a method for determining an error of a source amplifier in a display driving device, which may check the error of the output buffer (e. g., source amplifier) corresponding to each pixel (e. g., subpixel) by using a relatively small number of elements or a small-sized element.

To achieve these and other advantages and in accordance with the present disclosure, as embodied and broadly described, a display driving device includes a first source amplifier configured to receive first source voltage corresponding to a first gray value and outputting first data voltage; a first channel circuit configured to supply the first data voltage output from the first source amplifier to a first data line; a determination circuit configured to determine whether an error occurs by comparing the first data voltage output from the first source amplifier and reference voltage; and a switching circuit configured to connect an output line of the first source amplifier to any one channel circuit of the first channel circuit and a second channel circuit connected to a pixel adjacent to a pixel of the first channel circuit based on a determination result of the determination circuit.

In another aspect of the present disclosure, a method for determining an error of a source amplifier of a display driving device, includes receiving, by a first source amplifier, first source voltage corresponding to a first gray value and outputting first data voltage; supplying the first data voltage output from the first source amplifier to a first data line through a first channel circuit; determining, by a determination circuit, whether an error occurs by comparing the first data voltage output from the first source amplifier and reference voltage; and switching an output line of the first source amplifier from the first channel circuit to a second channel circuit when it is identified that the first source amplifier has the error according to a determination result of the determination circuit.

In a further aspect of the present disclosure, a display driving device includes a first source amplifier configured to receive first source voltage corresponding to a first gray value and outputting first data voltage; a first channel circuit configured to supply the first data voltage output from the first source amplifier to a first data line; a second source amplifier configured to receive second source voltage corresponding to a second gray value and outputting second data voltage; a second channel circuit configured to supply the second data voltage output from the second source amplifier to a second data line; an amplifier configured to output reference voltage set based on a control signal; a determination circuit configured to determine whether an error occurs by comparing the first data voltage output from the first source amplifier and the reference voltage output from the amplifier; and a switching circuit configured to connect an output line of the first source amplifier to any one channel circuit of the first channel circuit and the second channel circuit based on a determination result of the determination circuit.

As described above, according to an aspect, the output voltage (e. g., data voltage) of the output buffer (e. g., source amplifier) corresponding to each pixel (e. g., subpixel) is sequentially compared with the reference voltage to check the error of the output buffer, thereby reducing the number and sizes of elements used for checking the error. As a result, areas of the elements occupied in the source driver may be reduced.

Further, according to an aspect, the output voltage (e. g., data voltage) of the output buffer (e. g., source amplifier) corresponding to each pixel (e. g., subpixel) is sequentially compared with the reference voltage to check the error of the output buffer and the error is repaired in the same frame, thereby reducing the time required for error inspection and repairing.

Further, according to an aspect, the output voltage (e. g., data voltage) of the output buffer (e. g., source amplifier) corresponding to each pixel (e. g., subpixel) is compared with the reference voltage to increase the reliability of error checking. Further, the amplifier used as the comparator is allowed to operate only at the scan time to reduce power consumption.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
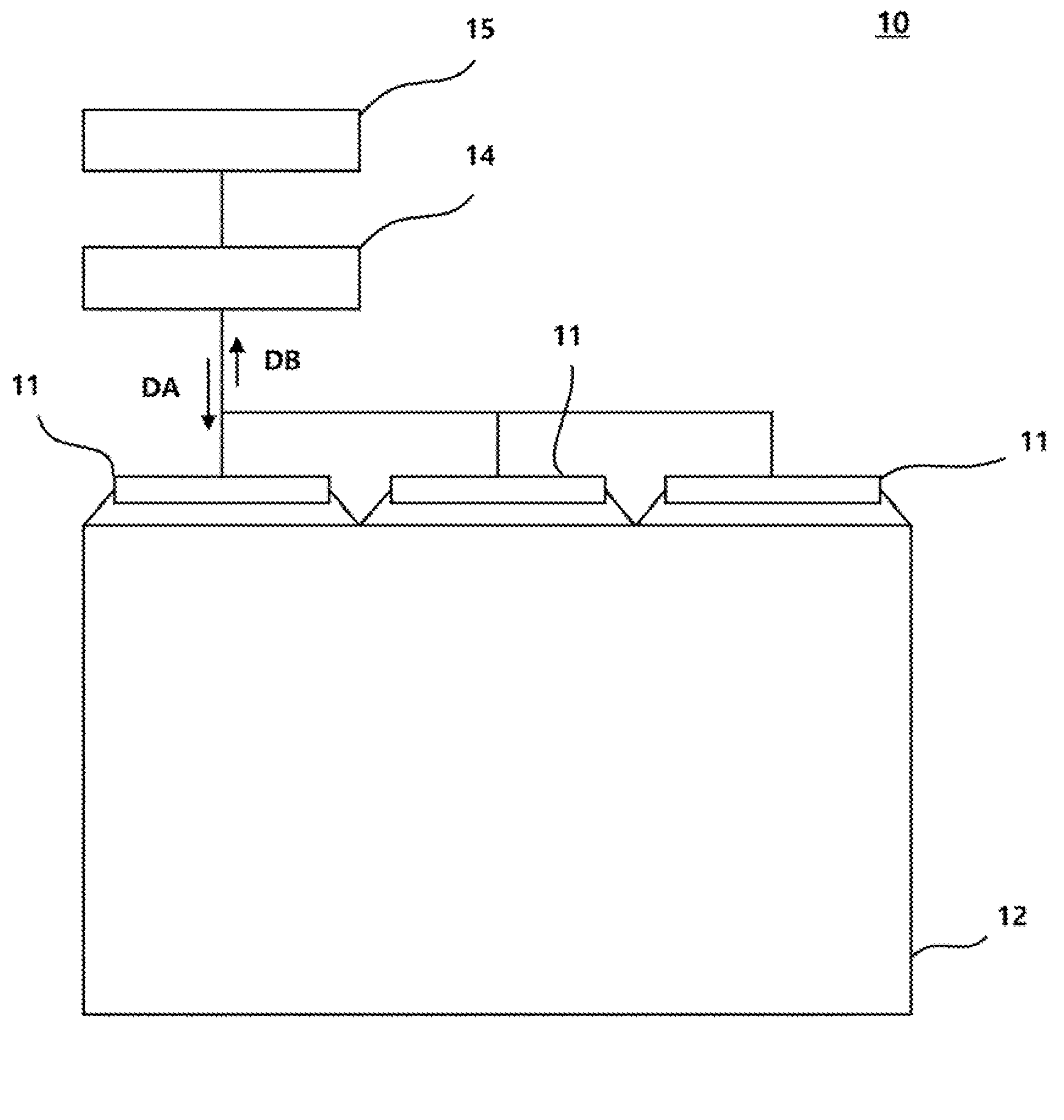
FIG. 1 is a configuration diagram of a display device according to an aspect of the present disclosure.

FIG. 1 is a configuration diagram of a display device according to an aspect.

Referring to FIG. 1, the display device 10 may include a display panel 12, a data driving device 11 (e.g., source driver), a data processing device 14 (e.g., timing controller), and a host device 15.

A plurality of pixels may be arranged in a horizontal and vertical matrix structure in the display panel 12. The display panel 12 may also be a liquid crystal display panel or an organic light emitting diode (OLED) panel. Each pixel may include a plurality of subpixels (e.g., R, G, and B).

In the display panel, a plurality of data lines may be arranged in one direction (e.g., a vertical direction in FIG. 1) and a plurality of gate lines may be arranged in the other one direction (e.g., a horizontal direction in FIG. 1). In addition, the pixel (e.g., subpixel) may be arranged around an intersection of the data line and the gate line.

When a turn-on signal is supplied to the gate line, the data line may be connected to the pixel while a transistor arranged in the pixel is turned on, and when a turn-off signal is supplied, the connection of the data line and the pixel (e.g., subpixel) may be released. The turn-on signal is also referred to as a scan signal.

The data driving device 11 (e.g., source driver) may supply data voltage to the data line. The data driving device 11 may include a plurality of channel circuits, and each channel circuit may supply the data voltage to the data line while being connected to the data line.

The data driving device 11 may receive image data DA from the data processing device (e.g., timing controller). The image data DA may include a gray value of each pixel (e.g., subpixel), and the channel circuit may supply the data voltage corresponding to the gray value to the data line. One pixel (e.g., subpixel) may be connected to the data line according to the scan signal, and the data voltage may be supplied to the pixel (e.g., subpixel) connected to the data line. In addition, a gray of the corresponding pixel (e.g. subpixel) may be adjusted according to the data voltage.

The data driving device 11 may be constituted by a plurality of integrated circuits. In addition, a predetermined number of data lines may be allocated and connected to respective integrated circuits.

The data driving device 11 may include an analog digital converter (ADC). The data driving device 11 may sense a property of the pixel by using the analog digital converter, and transmit pixel property sensing data to the data processing device 14. In addition, the data processing device 14 may compensate the image data to suit the property of each pixel according to the pixel property sensing data, and transmit the compensated image data DA to the data driving device 11. For example, when the display panel 12 is the OLED panel, the data driving device 11 may sense a property deviation or a degradation degree, and the data processing device 14 may compensate for the image data to reflect the property deviation or the degradation degree.

A touch sensor may be further arranged in the display panel 12, and the data driving device 11 may further include a touch driving circuit that drives the touch sensor. In addition, the touch driving circuit may include the analog digital converter. The touch driving circuit may supply a touch driving signal to the touch sensor, and receive a reaction signal to the touch driving signal from the touch sensor. In addition, the touch driving circuit may convert the reaction signal into touch sensing data by using the analog digital converter, and transmit the converted touch sensing data to another device.

According to an aspect, as described above, each pixel (e. g., subpixel) of the display panel 12 may receive the data voltage for driving from the data driving device 11 (e. g., display driving device or source driver). To this end, an output buffer (e. g., source amplifier) may be provided on an output stage of the display driving device 11. The output buffer may be connected to the data line of each pixel (e. g., subpixel) through the channel circuit. Each output buffer buffers or amplifies analog voltage (hereinafter, referred to as 'source voltage' for convenience of description) corresponding to the gray value converted by the digital analog converter to output the data voltage (or driving voltage). The data voltage (or driving voltage) output from each output buffer may be supplied to the relevant pixel (e. g., subpixel) through the data line. Source voltage which is input voltage of the output buffer and the data voltage (or driving voltage) which is output voltage may have the same or similar magnitude.

According to an aspect, when the error occurs in each output buffer (e. g., source amplifier) included in the data driving device 11, normal driving voltage cannot be provided to the relevant pixel (e. g., subpixel), a screen may not be normally displayed. Hereinafter, aspects in which the error of each output buffer (e. g., source amplifier) included in the data driving device 11 may be checked and the checked error may be repaired will be described.

Figure 2A:
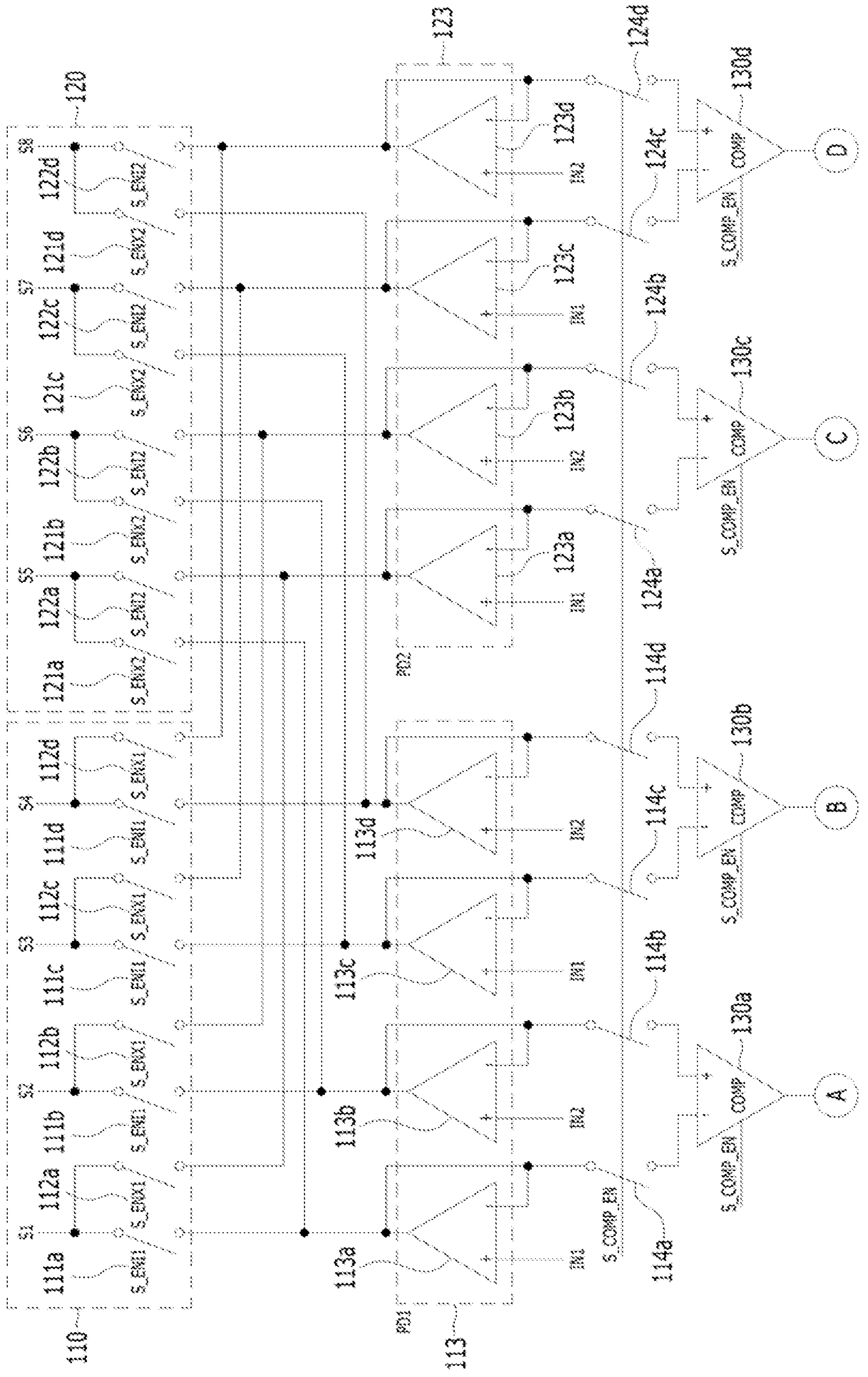
FIG. 2A is a circuit diagram of a display driving device according to an aspect of the present disclosure.
Figure 2B:
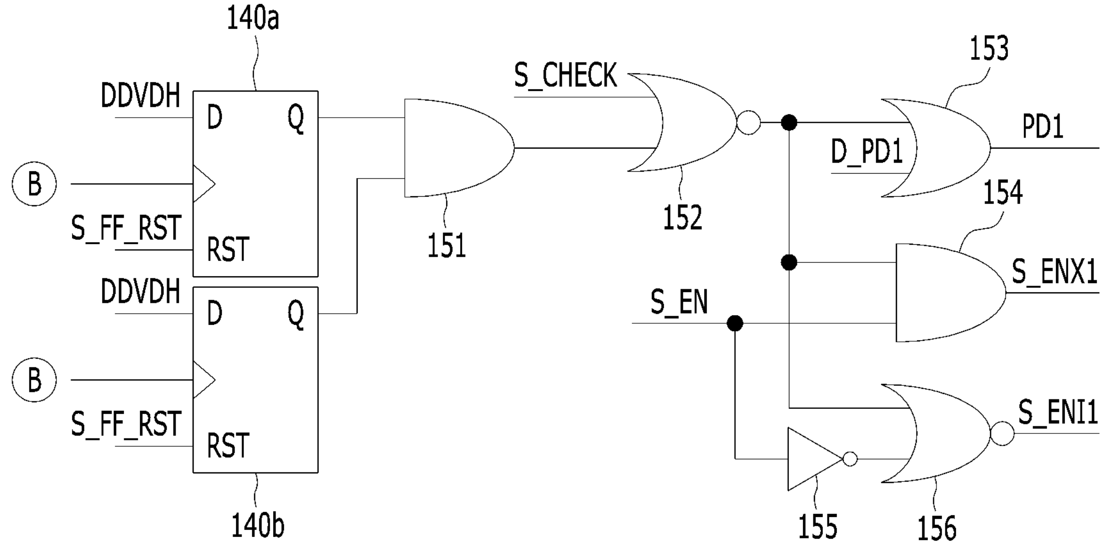
FIG. 2B is a circuit diagram of a determination circuit included in the display driving device according to an aspect of the present disclosure.
Figure 2C:
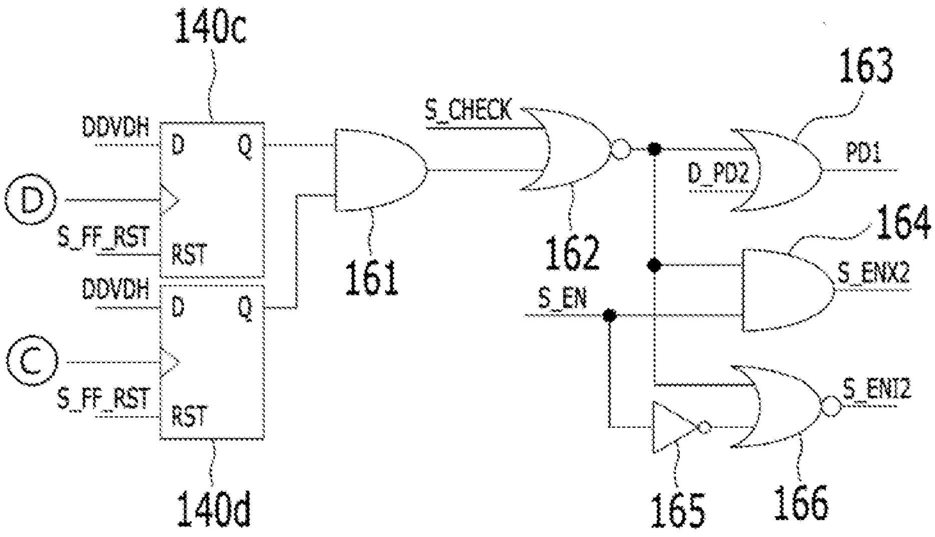
FIG. 2C is a circuit diagram of the determination circuit included in the display driving device according to an aspect of the present disclosure.

FIG. 2A is a circuit diagram of a display driving device according to an aspect, FIG. 2B is a circuit diagram of a determination circuit included in the display driving device according to an aspect, and FIG. 2C is a circuit diagram of the determination circuit included in the display driving device according to an aspect.

Referring to FIGS. 2A, 2B, and 2C, the display driving device (e.g., data driving device 11 or source driver) may include channel circuits 110 and 120 connected to each pixel (e.g., subpixel) and source amplifiers 113 and 123 (e.g., output buffers) connected to respective channel circuits 110 and 120. Channel circuits connected to eight subpixels included in two pixels, respectively are illustrated in FIGS. 2A, 2B, and 2C, but this may be appreciated as illustrating only some of all channel circuits for the description.

According to an aspect, a first channel circuit group 110 may correspond to a first pixel, and a second channel circuit group 120 may correspond to a second pixel. Each of the channel circuit groups 110 and 120 may include a plurality of (e. g., 4) channel circuits. Each channel circuit may be connected to any one subpixel among the plurality of (e. g., 4) subpixels included in the pixel. Each of the plurality of channel circuits included in each of the channel circuit groups 110 and 120 may supply driving voltage output from each of the source amplifiers 113 and 123 to the relevant pixel (e. g., subpixel) through each data line.

According to an aspect, a 1-1$^{st}$ channel circuit S1 among the channel circuits included in the first channel group 110 may be connected to a 1-1$^{st}$ subpixel (e.g. an R pixel) of the first pixel, a 1-2$^{nd}$ channel circuit S2 may be connected to a 1-2$^{nd}$ subpixel (e.g. a G pixel) of the first pixel, a 1-3$^{rd}$ channel circuit S3 may be connected to a 1-3$^{rd}$ subpixel (e.g., a B pixel) of the first pixel, and a 1-4$^{th}$ channel circuit S4 may be connected to a 1-4$^{th}$ subpixel (e.g. a G pixel) of the first pixel. Similarly, among the channel circuits included in the second channel circuit group 120, a 2-1$^{st}$ channel circuit S5 may be connected to a 2-1$^{st}$ subpixel (e.g. the R pixel) of the second pixel, a 2-2$^{nd}$ channel circuit S6 may be connected to a 2-2$^{nd}$ subpixel (e.g. the G pixel) of the second pixel, a 2-3$^{rd}$ channel circuit S7 may be connected to a 2-3$^{rd}$ subpixel (e.g., the B pixel) of the second pixel, and a 2-4$^{th}$ channel circuit S8 may be connected to a 2-4$^{th}$ subpixel (e.g. the G pixel) of the second pixel.

According to an aspect, each channel circuit may include a main switch, and may be connected to each source amplifier through the main switch. For example, the 1-1$^{st}$ channel circuit S1 may be connected to a 1-1$^{st}$ source amplifier 113*a* through a 1-1$^{st}$ main switch 111*a*. The 1-2$^{nd}$ channel circuit S2 may be connected to a 1-2$^{nd}$ source amplifier 113*b* through a 1-2$^{nd}$ main switch 111*b*. The 1-3$^{rd}$ channel circuit S3 may be connected to a 1-3$^{rd}$ source amplifier 113*c* through a 1-3$^{rd}$ main switch 111*c*. The 1-4$^{th}$ channel circuit S4 may be connected to a 1-4$^{th}$ source amplifier 113*d* through a 1-4$^{th}$ main switch 111*d*. Similarly, the 2-1$^{st}$ channel circuit S5 may be connected to a 2-1$^{st}$ source amplifier 123*a* through a 2-1$^{st}$ main switch 122*a*. The 2-2$^{nd}$ channel circuit S6 may be connected to a 2-2$^{nd}$ source amplifier 123*b* through a 2-2$^{nd}$ main switch 122*b*. The 2-3$^{rd}$ channel circuit S7 may be connected to a 2-3$^{rd}$ source amplifier 123*c* through a 2-3$^{rd}$ main switch 122*c*. The 2-4$^{th}$ channel circuit S8 may be connected to a 2-4$^{th}$ source amplifier 123*d* through a 2-4$^{th}$ main switch 122*d*.

According to an aspect, each channel circuit may further include a sub switch connected to a main switch in parallel. The data line connected to each channel circuit may be connected to the relevant source amplifier through the main switch based on an operation of the switch, and connected to a source amplifier of an adjacent pixel through the sub switch. For example, the 1-1$^{st}$ main switch 111*a* of the 1-1$^{st}$ channel circuit S1 may be connected to a 1-1$^{st}$ sub switch 112*a* in parallel. The 1-2$^{nd}$ main switch 111*b* of the 1-2$^{nd}$ channel circuit S2 may be connected to a 1-2$^{nd}$ sub switch 112*b* in parallel. The 1-3$^{rd}$ main switch 111*c* of the 1-3$^{rd}$ channel circuit S3 may be connected to a 1-3$^{rd}$ sub switch 112*c* in parallel. The 1-4$^{th}$ main switch 111*d* of the 1-4$^{th}$ channel circuit S4 may be connected to a 1-4$^{th}$ sub switch 112*d* in parallel. Similarly, the 2-1$^{st}$ main switch 122*a* of the 2-1$^{st}$ channel circuit S5 may be connected to a 2-1$^{st}$ sub switch 121*a* in parallel. The 2-2$^{nd}$ main switch 122*b* of the 2-2$^{nd}$ channel circuit S6 may be connected to a 2-2$^{nd}$ sub switch 121*b* in parallel. The 2-3$^{rd}$ main switch 122*c* of the 2-3$^{rd}$ channel circuit S7 may be connected to a 2-3$^{rd}$ sub switch 121*c* in parallel. The 2-4$^{th}$ main switch 122*d* of the 2-4$^{th}$ channel circuit S8 may be connected to a 2-4$^{th}$ sub switch 121*d* in parallel.

According to an aspect, when each sub switch is controlled in an on state, the relevant data line may be connected to a channel circuit corresponding to a subpixel of an adjacent pixel. When the error occurs in the source amplifier corresponding to the relevant channel circuit, the sub switch is connected to the relevant data line instead of the main switch to supply data voltage (or driving voltage) output from an adjacent source amplifier in which the error does not occur to the relevant pixel (e. g., subpixel).

According to an aspect, during a normal operation of a display, the data voltage (or driving voltage) output from each of the source amplifiers 113 and 123 may be supplied to the relevant data line through each main switch. The data voltage (or driving voltage) output from each data line may be supplied to the pixel (e. g., subpixel) connected to the relevant data line.

According to an aspect, when a test mode is set, the display driving device may perform a test operation for the source amplifiers 113 and 123. For example, source voltage for a test may be applied to a non-inversion terminal (positive terminal) of each of the source amplifiers 113 and 123. An output of each of the source amplifiers 113 and 123 may be fed back and input into an inversion terminal (negative terminal) of each of the source amplifiers 113 and 123. For example, first source voltage IN1 may be applied to the non-inversion terminal of the 1-1$^{st}$ source amplifier 113*a*, and second source voltage IN2 may be applied to the non-inversion terminal of the 1-2$^{nd}$ source amplifier 113*b*. The output of the 1-1$^{st}$ source amplifier 113*a* may output first data voltage, and the output of the 1-2$^{nd}$ source amplifier 113*b* may output second data voltage.

According to an aspect, the first data voltage may be input into the inversion terminal of a first comparator 130*a* through a 1-1$^{st}$ comparator switch 114*a*. The second data voltage may be input into the non-inversion terminal of the first comparator 130*a* through a 1-2$^{nd}$ comparator switch 114*b*. The first comparator 130*a* may output a comparison result between the first data voltage and the second data voltage. For example, when the first data voltage is larger than the second data voltage, a low (L) signal may be output, and when the second data voltage is larger than the first data voltage, a high (H) signal may be output. The output of the first comparator 130*a* may be input into a first D-flipflop 140*b* through node A. When the second source voltage IN2 increases from lower voltage to higher voltage than the first source voltage IN1, which is applied to the non-inversion terminal of the 1-2$^{nd}$ source amplifier 113*b* during the test operation, if it is assumed that both the 1-1$^{st}$ source amplifier 113*a* and the 1-2$^{nd}$ source amplifier 113*b* are in a normal state, the output of the first comparator 130*a* may be changed from the low signal to the high signal. As the first D-flipflop 140*b* receives an input changed from the low signal to the high signal, the first D-flipflop 140*b* may output the high (H) signal corresponding to a rising edge. On the contrary, when the second source voltage IN2 increases from lower voltage to higher voltage than the first source voltage IN1, which is applied to the non-inversion terminal of the 1-2$^{nd}$ source amplifier 113*b* during the test operation, if it is assumed that any one of the 1-1$^{st}$ source amplifier 113*a* and the 1-2$^{nd}$ source amplifier 113*b* is in an error state, the output of the first comparator 130*a* may not be changed from the low signal to the high signal. As the first D-flipflop 140*b* receives the low signal, the first D-flipflop 140*b* may output the low (L) signal.

Similarly, the first data voltage may be input into the inversion terminal of the second comparator 130*b* through a 1-3$^{rd}$ comparator switch 114*c*. The second data voltage may be input into the non-inversion terminal of the second comparator 130*b* through a 1-4$^{th}$ comparator switch 114*d*. The second comparator 130*b* may output the comparison result between the first data voltage and the second data voltage. For example, when the first data voltage is larger than the second data voltage, the low (L) signal may be output, and when the second data voltage is larger than the first data voltage, the high (H) signal may be output. The output of the second comparator 130*b* may be input into a second D-flipflop 140*b* through node B. When the second source voltage IN2 increases from lower voltage to higher voltage than the first source voltage IN1, which is applied to the non-inversion terminal of the 1-4$^{th}$ source amplifier 113*d* during the test operation, if it is assumed that both the 1-3$^{rd}$ source amplifier 113*c* and the 1-4$^{th}$ source amplifier 113*d* are in the normal state, the output of the second comparator 130*b* may be changed from the low signal to the high signal. As the second D-flipflop 140*a* receives the input changed from the low signal to the high signal, the second D-flipflop 140*a* may output the high (H) signal corresponding to the rising edge. On the contrary, when the second source voltage IN2 increases from lower voltage to higher voltage than the first source voltage IN1, which is applied to the non-inversion terminal of the 1-4$^{th}$ source amplifier 113*d* during the test operation, if it is assumed that any one of the 1-3$^{rd}$ source amplifier 113*c* and the 1-4$^{th}$ source amplifier 113*d* is in the error state, the output of the second comparator 130*b* may not be changed from the low signal to the high signal. As the second D-flipflop 140*a* receives the low signal, the second D-flipflop 140*a* may output the low (L) signal.

According to an aspect, referring to FIG. 2B, the outputs of the first D-flipflop 140*b* and the second D-flipflop 140*a* may be input into a first AND gate 151. The first AND gate 151 may output the high (H) signal when all of the 1-1$^{st}$ source amplifier 113*a*, the 1-2$^{nd}$ source amplifier 113*b*, the 1-3$^{rd}$ source amplifier 113*c* and the 1-4$^{th}$ source amplifier 113*d* are in the normal state. On the contrary, the first AND gate 151 may output the low (L) signal when any one source amplifier of the 1-1$^{st}$ source amplifier 113*a*, the 1-2$^{nd}$ source amplifier 113*b*, the 1-3$^{rd}$ source amplifier 113*c* and the 1-4$^{th}$ source amplifier 113*d* has the error. When the output of the first AND gate 151 is the high (H) signal, all of source amplifiers corresponding to the relevant pixel are in the normal state, so the main switch may be controlled to be connected to each channel circuit corresponding to the relevant pixel. On the contrary, when the output of the first AND gate 151 is the low (L) signal, at least one source amplifier of the source amplifiers corresponding to the relevant pixel is in the error state, so the main switch may be controlled to be switched to the sub switch and connected to each channel circuit corresponding to the relevant pixel.

According to an aspect, the output of the first AND gate 151 may be input into one terminal of a first NOR gate 152. An S_CHECK signal indicating a test mode may be input into the other terminal of the first NOR gate 152. As a result, the first NOR gate 152 may output the high (H) signal when the output of the first AND gate 151 is the low (L) signal and S_CHECK is switched to the low (L) signal in a next frame. As the first NOR gate 152 outputs the high (H) signal, the main switch may be controlled to be switched to the sub switch and connected to each channel circuit corresponding to the relevant pixel.

According to an aspect, the output of the first NOR gate 152 may be input into one input terminal of a first OR gate 153, a second AND gate 154, and a second NOR gate 156. The first OR gate 153 may receive the output of the first NOR gate 152 and a D_PD1 signal, and output a PD1 signal. When the output of the first OR gate 153 is high (H), power supplying of the source amplifiers 113*a*, 113*b*, 113*c*, and 113*d* corresponding to the first pixel may be interrupted. The second AND gate 154 may receive the output of the first NOR gate 152 and an S_ENX1 signal, and output an S_ENX1 signal. When the output of the second AND gate 154 is high (H), the sub switches 112*a*, 112*b*, 112*c*, and 112*d* corresponding to the first pixel may be controlled in the on state. On the contrary, when the output of the second AND gate 154 is low (L), the sub switches 112*a*, 112*b*, 112*c*, and 112*d* corresponding to the first pixel may be controlled in an off state. The second NOR gate 156 may receive the output of the first NOR gate 152 and a signal to which the S_EN signal is switched by a first inverter 155, and output an S_ENI1 signal. When the output of the second NOR gate 156 is high (H), the sub switches 112*a*, 112*b*, 112*c*, and 112*d* corresponding to the first pixel may be controlled in the on state. On the contrary, when the output of the second NOR gate 156 is low (L), the sub switches 112*a*, 112*b*, 112*c*, and 112*d* corresponding to the first pixel may be controlled in the off state.

Referring to FIG. 2C, similarly as described above in FIG. 2B, according to an aspect, the first data voltage may be input into the inversion terminal of the third comparator 130*c* through the 2-$1^{st}$ comparator switch 124*a*. The second data voltage may be input into the non-inversion terminal of the third comparator 130*c* through the 2-$2^{nd}$ comparator switch 124*b*. The third comparator 130*c* may output the comparison result between the first data voltage and the second data voltage. Further, the first data voltage may be input into the inversion terminal of the fourth comparator 130*d* through a 2-$3^{rd}$ comparator switch 124*c*. The second data voltage may be input into the non-inversion terminal of the fourth comparator 130*d* through a 2-$4^{th}$ comparator switch 124*d*. The fourth comparator 130*d* may output the comparison result between the first data voltage and the second data voltage.

Similarly as in FIG. 2B, the output of the third comparator 130*c* may be input into a third D-flipflop 140*d* through node C. The output of the fourth comparator 130*d* may be input into a fourth D-flipflop 140*c* through node D. The output of the third D-flipflop 140*d* and the fourth D-flipflop 140*c* may be input into a third AND gate 161. The third AND gate 161 may output the high (H) signal when all of the 2-$1^{st}$ source amplifier 123*a*, the 2-$2^{nd}$ source amplifier 123*b*, the 2-$3^{rd}$ source amplifier 123*c* and the 2-$4^{th}$ source amplifier 123*d* are in the normal state. On the contrary, the third AND gate 161 may output the low (L) signal when any one source amplifier of the 2-$1^{st}$ source amplifier 123*a*, the 2-$2^{nd}$ source amplifier 123*b*, the 2-$3^{rd}$ source amplifier 123*c* and the 2-$4^{th}$ source amplifier 123*d* has the error. According to an aspect, the output of the third AND gate 161 may be input into one terminal of the third NOR gate 162. The S_CHECK signal indicating the test mode may be input into the other terminal of the third NOR gate 162. As a result, the third NOR gate 162 may output the high (H) signal when the output of the third AND gate 161 is the low (L) signal and S_CHECK is switched to the low (L) signal in the next frame. As the third NOR gate 162 outputs the high (H) signal, the main switch may be controlled to be switched to the sub switch and connected to each channel circuit corresponding to the relevant pixel.

Similarly as in FIG. 2B, the output of the third NOR gate 162 may be input into one input terminal of a third OR gate 163, a fourth AND gate 164, and a fourth NOR gate 166. The third OR gate 163 may receive the output of the third NOR gate 162 and the D_PD1 signal, and output the PD1 signal. When the output of the third OR gate 163 is high (H), power supplying of the source amplifiers 123*a*, 123*b*, 123*c*, and 123*d* corresponding to the second pixel may be interrupted. The fourth AND gate 164 may receive the output of the third NOR gate 162 and the S_EN signal, and output an S_ENX2 signal. When the output of the fourth AND gate 164 is high (H), the sub switches 121*a*, 121*b*, 121*c*, and 121*d* corresponding to the second pixel may be controlled in the on state. On the contrary, when the output of the fourth AND gate 164 is low (L), the sub switches 121*a*, 121*b*, 121*c*, and 121*d* corresponding to the second pixel may be controlled in the off state. The fourth NOR gate 166 may receive the output of the third NOR gate 162 and a signal to which the S_EN signal is switched by a second inverter 165, and output the S_ENI2 signal. When the output of the fourth NOR gate 166 is high (H), the main switches 122*a*, 122*b*, 122*c*, and 122*d* corresponding to the second pixel may be controlled in the on state. On the contrary, when the output of the fourth NOR gate 166 is low (L), the main switches 122*a*, 122*b*, 122*c*, and 122*d* corresponding to the second pixel may be controlled in the off state.

Referring to FIGS. 2A, 2B, and 2C described above, each source amplifier may be connected to four subpixels corresponding to each pixel. In this case, to check whether four source amplifiers corresponding to four subpixels included in each pixel have the error, two comparators 130*a* and 130*b* and two D-flipflops 140*a* and 140*b* may be required. The comparators and the D-flipflops may cause increasing the size of the display driving device (e. g., the source driver). Further, since the comparator compares data voltages output from the respective source amplifiers with each other to check whether the source amplifier has the error, when two source amplifiers have the error, it may be difficult to accurately check the error.

Hereinafter, referring to FIGS. 3A, 3B, and 3C, a display driving device will be described which may check the error of the source amplifier while reducing the numbers of comparators and D-flipflops.

Figure 3A:
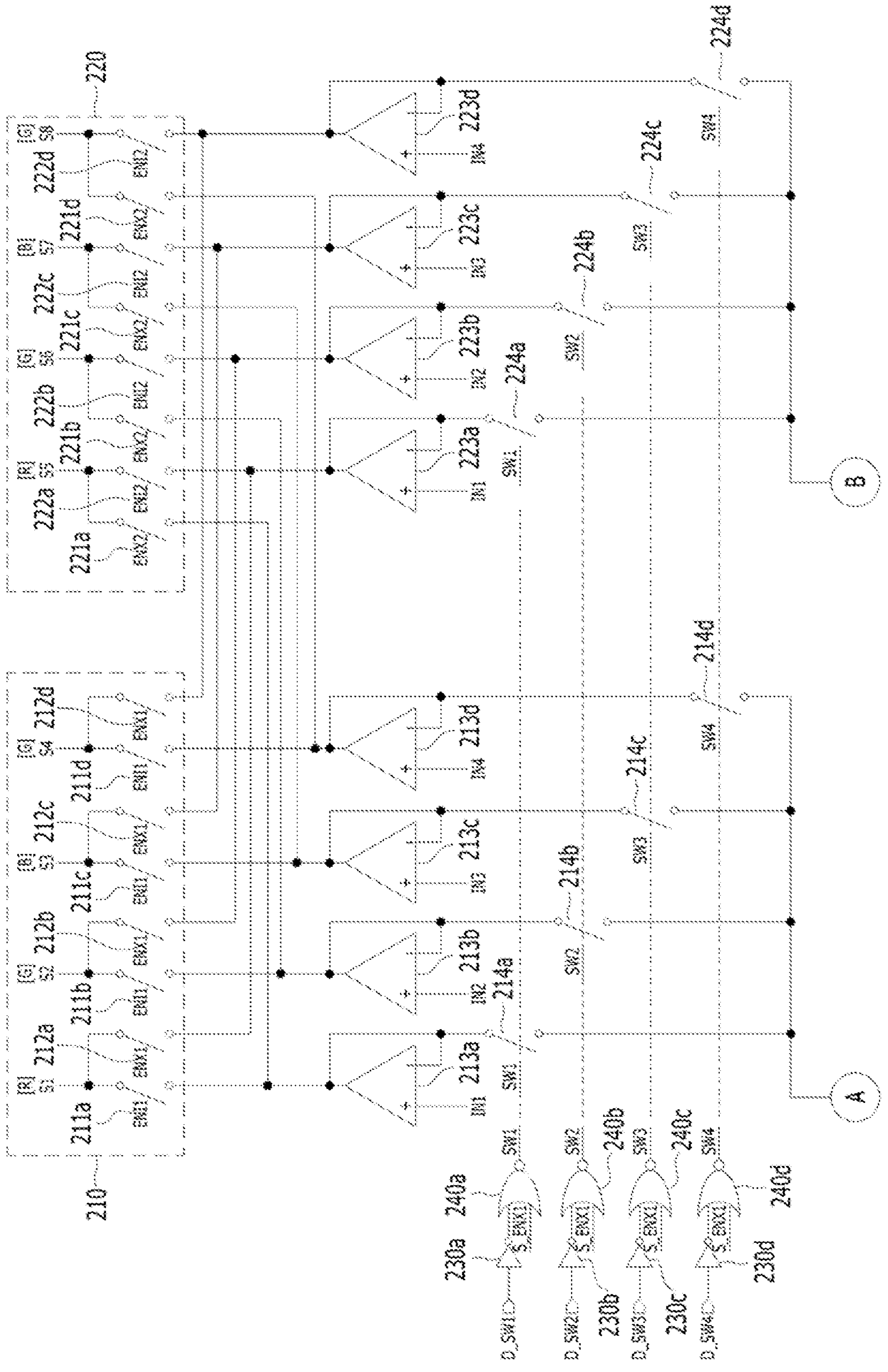
FIG. 3A is a circuit diagram of the display driving device according to an aspect of the present disclosure.
Figure 3B:
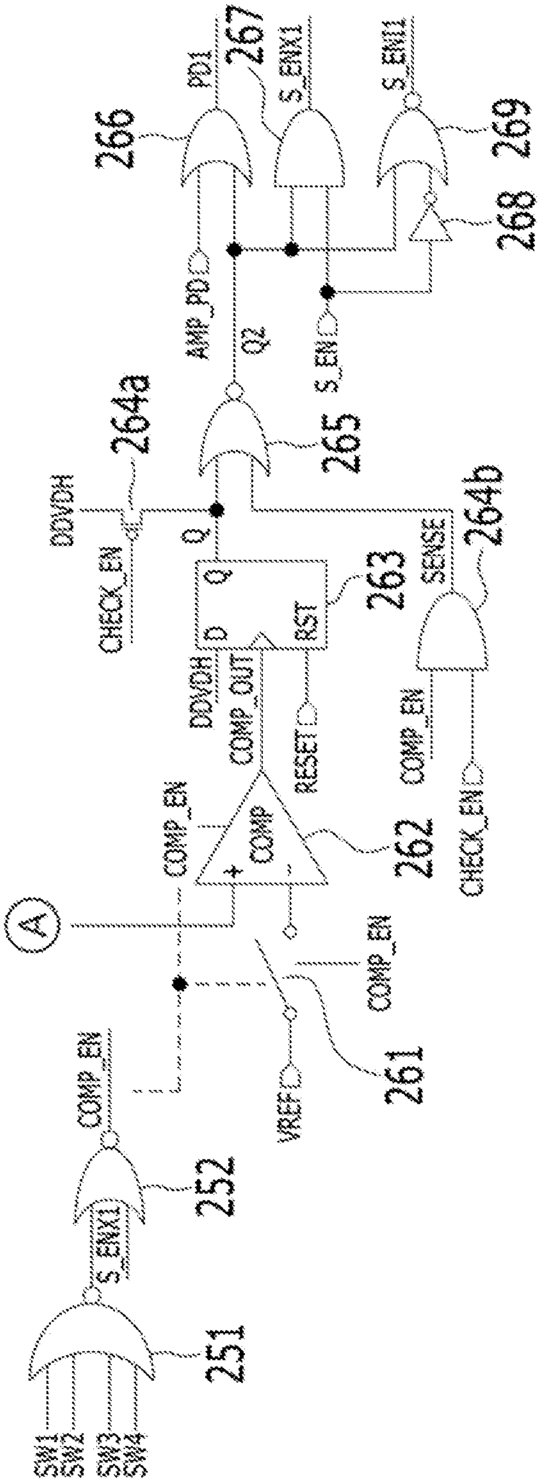
FIG. 3B is a circuit diagram of the determination circuit included in the display driving device according to an aspect of the present disclosure.
Figure 3C:
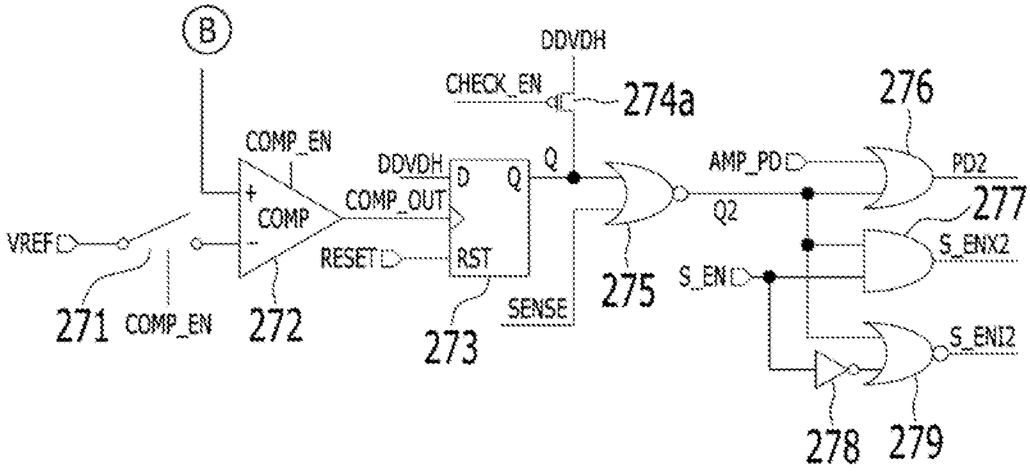
FIG. 3C is a circuit diagram of the determination circuit included in the display driving device according to an aspect of the present disclosure.

FIG. 3A is a circuit diagram of a display driving device according to an aspect, FIG. 3B is a circuit diagram of a determination circuit included in the display driving device according to an aspect, and FIG. 3C is a circuit diagram of the determination circuit included in the display driving device according to an aspect.

Referring to FIGS. 3A, 3B, and 3C, the display driving device (e.g., the data driving device 11 or the source driver) may include channel circuits 210 and 220 connected to each pixel (e.g., subpixel) and source amplifiers 213 and 223 (e.g., output buffers) connected to respective channel circuits 210 and 220. Channel circuits connected to eight subpixels included in two pixels, respectively are illustrated in FIGS. 3A, 3B, and 3C, but this may be appreciated as illustrating only some of all channel circuits for the description.

According to an aspect, a first channel circuit group 210 may correspond to a first pixel, and a second channel circuit group 220 may correspond to a second pixel. Each of the channel circuit groups 210 and 220 may include a plurality of (e. g., 4) channel circuits. Each channel circuit may be connected to any one subpixel among the plurality of (e. g., 4) subpixels included in the pixel. Each of the plurality of channel circuits included in each of the channel circuit groups 210 and 220 may supply data voltage (or driving voltage) output from each of the source amplifiers 213 and 223 to the relevant pixel (e. g., subpixel) through each data line.

According to an aspect, a 1-$1^{st}$ channel circuit S1 among the channel circuits included in the first channel group 210 may be connected to a 1-$1^{st}$ subpixel (e.g. an R pixel) of the first pixel, a 1-$2^{nd}$ channel circuit S2 may be connected to a 1-$2^{nd}$ subpixel (e.g. a G pixel) of the first pixel, a 1-$3^{rd}$ channel circuit S3 may be connected to a 1-3$^{rd}$ subpixel (e.g., a B pixel) of the first pixel, and a 1-4$^{th}$ channel circuit S4 may be connected to a 1-4$^{th}$ subpixel (e.g. a G pixel) of the first pixel. Similarly, among the channel circuits included in the second channel circuit group 120, a 2-1$^{st}$ channel circuit S5 may be connected to a 2-1$^{st}$ subpixel (e.g. the R pixel) of the second pixel, a 2-2$^{nd}$ channel circuit S6 may be connected to a 2-2$^{nd}$ subpixel (e.g. the G pixel) of the second pixel, a 2-3$^{rd}$ channel circuit S7 may be connected to a 2-3$^{rd}$ subpixel (e.g., the B pixel) of the second pixel, and a 2-4$^{th}$ channel circuit S8 may be connected to a 2-4$^{th}$ subpixel (e.g. the G pixel) of the second pixel.

According to an aspect, each channel circuit may include a main switch, and may be connected to each source amplifier through the main switch. For example, the 1-1$^{st}$ channel circuit S1 may be connected to a 1-1$^{st}$ source amplifier 213*a* through a 1-1$^{st}$ main switch 211*a*. The 1-2$^{nd}$ channel circuit S2 may be connected to a 1-2$^{nd}$ source amplifier 213*b* through a 1-2$^{nd}$ main switch 211*b*. The 1-3$^{rd}$ channel circuit S3 may be connected to a 1-3$^{rd}$ source amplifier 213*c* through a 1-3$^{rd}$ main switch 211*c*. The 1-4$^{th}$ channel circuit S4 may be connected to a 1-4$^{th}$ source amplifier 213*d* through a 1-4$^{th}$ main switch 211*d*. Similarly, the 2-1$^{th}$ channel circuit S5 may be connected to a 2-1$^{st}$ source amplifier 223*a* through a 2-1$^{st}$ main switch 222*a*. The 2-2$^{nd}$ channel circuit S6 may be connected to a 2-2$^{nd}$ source amplifier 223*b* through a 2-2$^{nd}$ main switch 222*b*. The 2-3$^{rd}$ channel circuit S7 may be connected to a 2-3$^{rd}$ source amplifier 223*c* through a 2-3$^{rd}$ main switch 222*c*. The 2-4$^{th}$ channel circuit S8 may be connected to a 2-4$^{th}$ source amplifier 223*d* through a 2-4$^{th}$ main switch 222*d*.

According to an aspect, each channel circuit may further include a sub switch connected to a main switch in parallel. The data line connected to each channel circuit may be connected to the relevant source amplifier through the main switch based on an operation of the switch, and connected to a source amplifier of an adjacent pixel through the sub switch. For example, the 1-1$^{st}$ main switch 211*a* of the 1-1$^{st}$ channel circuit S1 may be connected to a 1-1$^{st}$ sub switch 212*a* in parallel. The 1-2$^{nd}$ main switch 211*b* of the 1-2$^{nd}$ channel circuit S2 may be connected to a 1-2$^{nd}$ sub switch 212*b* in parallel. The 1-3$^{rd}$ main switch 211*c* of the 1-3$^{rd}$ channel circuit S3 may be connected to a 1-3$^{rd}$ sub switch 212*c* in parallel. The 1-4$^{th}$ main switch 211*d* of the 1-4$^{th}$ channel circuit S4 may be connected to a 1-4$^{th}$ sub switch 212*d* in parallel. Similarly, the 2-1$^{st}$ main switch 222*a* of the 2-1$^{st}$ channel circuit S5 may be connected to a 2-1$^{st}$ sub switch 221*a* in parallel. The 2-2$^{nd}$ main switch 222*b* of the 2-2$^{nd}$ channel circuit S6 may be connected to a 2-2$^{nd}$ sub switch 221*b* in parallel. The 2-3$^{rd}$ main switch 222*c* of the 2-3$^{rd}$ channel circuit S7 may be connected to a 2-3$^{rd}$ sub switch 221*c* in parallel. The 2-4$^{th}$ main switch 222*d* of the 2-4$^{th}$ channel circuit S8 may be connected to a 2-4$^{th}$ sub switch 221*d* in parallel.

According to an aspect, when each sub switch is controlled in an on state, the relevant data line may be connected to a channel circuit corresponding to a subpixel of an adjacent pixel. When the error occurs in the source amplifier corresponding to the relevant channel circuit, the sub switch is connected to the relevant data line instead of the main switch to supply data voltage (or driving voltage) output from an adjacent source amplifier in which the error does not occur to the relevant pixel (e. g., subpixel).

According to an aspect, during a normal operation of a display, the data voltage (or driving voltage) output from each of the source amplifiers 213 and 223 may be supplied to the relevant data line through each main switch. The data voltage (or driving voltage) output from each data line may be supplied to the pixel (e. g., subpixel) connected to the relevant data line.

According to an aspect, when a test mode is set, the display driving device may perform a test operation for the source amplifiers 213 and 223. For example, source voltage for a test may be sequentially applied to a non-inversion terminal (positive terminal) of each of the source amplifiers 213 and 223. An output (e. g., data voltage) of each of the source amplifiers 213 and 223 may be fed back and input into an inversion terminal (negative terminal) of each of the source amplifiers 213 and 223. For example, the first source voltage IN1 may be applied to the non-inversion terminal of the 1-1$^{st}$ source amplifier 213*a* in a first time interval, the second source voltage IN2 may be applied to the non-inversion terminal of the 1-2$^{nd}$ source amplifier 213*b* in a second time interval, the third source voltage IN3 may be applied to the non-inversion terminal of the 1-3$^{rd}$ source amplifier 213*c* in a third time interval, and the fourth source voltage IN4 may be applied to the non-inversion terminal of the 1-4$^{th}$ source amplifier 213*d* in a fourth time interval. The first source voltage IN1, the second source voltage IN2, the third source voltage IN3, and the fourth source voltage IN4 may be set to the same voltage, and also set to different voltages. According to an aspect, the respective source voltages IN1, IN2, IN3, and IN4 may also supply a plurality of different voltages (e. g., first-level voltage, second-level voltage, and third-level voltage) according to test time points.

According to an aspect, the first data voltage may be input into the non-inversion terminal of a first comparator 262 through a 1-1$^{st}$ comparator switch 214*a* and node A in the first time interval. The second data voltage may be input into the non-inversion terminal of the first comparator 262 through the 1-1$^{st}$ comparator switch 214*a* and node A in the second time interval. The third data voltage may be input into the non-inversion terminal of the first comparator 262 through the 1-1$^{st}$ comparator switch 214*a* and node A in the third time interval. The fourth data voltage may be input into the non-inversion terminal of the first comparator 262 through the 1-1$^{st}$ comparator switch 214*a* and node A in the fourth time interval. As such, the data voltages output from the respective source amplifiers 213*a*, 213*b*, 213*c*, and 213*d* may be sequentially input into the first comparator 262 according to a time order.

Referring to FIG. 3B, according to an aspect, the first comparator 262 may receive reference voltage VREF through a reference voltage switch 261 connected the inversion terminal. The reference voltage VREF may be output from an amplifier that outputs reference voltage set based on a control signal. The amplifier that outputs the reference voltage may be included in the display driving device. As another example, the amplifier that outputs the reference voltage may be provided outside the display driving device and supply the reference voltage to the display driving device.

According to an aspect, the first comparator 262 may output a result of comparing first data voltage and the reference voltage in a first time interval. The first comparator 262 may output a result of comparing second data voltage and the reference voltage in a second time interval. The first comparator 262 may output a result of comparing third data voltage and the reference voltage in a third time interval. The first comparator 262 may output a result of comparing fourth data voltage and the reference voltage in a fourth time interval.

For example, the first comparator 262 may output a high (H) signal when each data voltage is larger than the reference voltage, and output a low (L) signal when the reference voltage is larger than each data voltage. An output of the first comparator 262 may be input into a first D-flipflop 263. When each of the source voltages IN1 to IN4 increases from lower voltage to higher voltage than the reference voltage VREF, which is applied to a non-inversion terminal of each of the source amplifiers 213*a*, 213*b*, 213*c*, and 213*d* during a test operation, if each source amplifier is in a normal state, the output of the first comparator 262 may be changed from a low signal to a high signal. As the first D-flipflop 263 receives an input changed from the low signal to the high signal, the first D-flipflop 263 may output the high (H) signal corresponding to a rising edge. On the contrary, when each of the source voltages IN1 to IN4 increases from lower voltage to higher voltage than the reference voltage VREF, which is applied to the non-inversion terminal of each of the source amplifiers 213*a*, 213*b*, 213*c*, and 213*d* during the test operation, if a specific source amplifier 213*a*, 213*b*, 213*c*, or 213*d* is in an error state, the output of the first comparator 262 may not be changed from the low signal to the high signal at a test time point of the relevant source amplifier. As the first D-flipflop 263 receives the low signal, the first D-flipflop 263 may output the low (L) signal.

According to an aspect, referring to FIG. 3B, the output of the first D-flipflop 263 may be input into one terminal of a first NOR gate 265. The output of a first AND gate 264*b* may be connected to the other terminal of the first NOR gate 265. One input terminal of the first AND gate 264*b* may receive a CHECK_EN signal indicating a test mode, and the other input terminal may receive a COMP_EN signal for controlling a comparator operation. The CHECK_IN signal may be controlled by the high signal during an interval in which the test mode is performed as illustrated in FIG. 4B to be described below. The COMP_EN signal may be controlled by the high signal during a test interval of each source amplifier as illustrated in FIG. 4C to be described below, and controlled by the low signal when it is determined that the error occurs in a specific source amplifier.

According to an aspect, the output of the first NOR gate 265 may be input into one input terminal of a first OR gate 266, a second AND gate 267, and a second NOR gate 269. The first OR gate 266 may receive the output of the first NOR gate 265 and an AMP_PD signal, and output a PD1 signal. When the output of the first OR gate 266 is high (H), power supplying of the source amplifiers 213*a*, 213*b*, 213*c*, and 213*d* corresponding to the first pixel may be interrupted. The second AND gate 267 may receive the output of the first NOR gate 265 and an S_EN signal, and output an S_ENX1 signal. When the output of the second AND gate 267 is high (H), the sub switches 212*a*, 212*b*, 212*c*, and 212*d* corresponding to the first pixel may be controlled in the on state. On the contrary, when the output of the second AND gate 267 is low (L), the sub switches 212*a*, 212*b*, 212*c*, and 212*d* corresponding to the first pixel may be controlled in an off state. The second NOR gate 269 may receive the output of the first NOR gate 265 and a signal to which the S_EN signal is switched by a first inverter 268, and output an S_ENI1 signal. When the output of the second NOR gate 269 is high (H), the main switches 211*a*, 211*b*, 211*c*, and 211*d* corresponding to the first pixel may be controlled in the on state. On the contrary, when the output of the second NOR gate 269 is low (L), the main switches 211*a*, 211*b*, 211*c*, and 211*d* corresponding to the first pixel may be controlled in the off state.

Referring to FIG. 3C, according to an aspect, the second comparator 272 may receive reference voltage VREF through a reference voltage switch 271 connected the inversion terminal. The second comparator 272 may output a result of comparing first data voltage and the reference voltage in a first time interval. The second comparator 272 may output a result of comparing second data voltage and the reference voltage in a second time interval. The second comparator 272 may output a result of comparing third data voltage and the reference voltage in a third time interval. The second comparator 272 may output a result of comparing fourth data voltage and the reference voltage in a fourth time interval.

For example, the second comparator 272 may output a high (H) signal when each data voltage is larger than the reference voltage, and output a low (L) signal when the reference voltage is larger than each data voltage. An output of the second comparator 272 may be input into a second D-flipflop 273. When each of the source voltages IN1 to IN4 increases from lower voltage to higher voltage than the reference voltage VREF, which is applied to a non-inversion terminal of each of the source amplifiers 223*a*, 223*b*, 223*c*, and 223*d* during a test operation, if each source amplifier is in a normal state, the output of the second comparator 272 may be changed from a low signal to a high signal. As the second D-flipflop 273 receives an input changed from the low signal to the high signal, the second D-flipflop 273 may output the high (H) signal corresponding to a rising edge. On the contrary, when each of the source voltages IN1 to IN4 increases from lower voltage to higher voltage than the reference voltage VREF, which is applied to the non-inversion terminal of each of the source amplifiers 223*a*, 223*b*, 223*c*, and 223*d* during the test operation, if a specific source amplifier 223*a*, 223*b*, 223*c*, or 223*d* is in an error state, the output of the second comparator 272 may not be changed from the low signal to the high signal at a test time point of the relevant source amplifier. As the second D-flipflop 273 receives the low signal, the second D-flipflop 273 may output the low (L) signal.

According to an aspect, referring to FIG. 3C, the output of the second D-flipflop 273 may be input into one terminal of a third NOR gate 275. The output of a third AND gate may be connected to the other terminal of the third NOR gate 275. One input terminal of the third AND gate may receive a CHECK_EN signal indicating the test mode, and the other input terminal may receive a COMP_EN signal for controlling the comparator operation. The CHECK_IN signal may be controlled by the high signal during an interval in which the test mode is performed as illustrated in FIG. 4B to be described below. The COMP_EN signal may be controlled by the high signal during a test interval of each source amplifier as illustrated in FIG. 4C to be described below, and controlled by the low signal when it is determined that the error occurs in a specific source amplifier.

According to an aspect, the output of the third NOR gate 275 may be input into one input terminal of a third OR gate 276, a fourth AND gate 277, and a fourth NOR gate 279. The third OR gate 276 may receive the output of the third NOR gate 275 and an AMP_PD signal, and output a PD2 signal. When the output of the third OR gate 276 is high (H), power supplying of the source amplifiers 223*a*, 223*b*, 223*c*, and 223*d* corresponding to the second pixel may be interrupted. The fourth AND gate 277 may receive the output of the third NOR gate 275 and an S_EN signal, and output an S_ENX2 signal. When the output of the fourth AND gate 277 is high (H), the sub switches 221*a*, 221*b*, 221*c*, and 221*d* corresponding to the second pixel may be controlled in the on state. On the contrary, when the output of the fourth AND gate 277 is low (L), the sub switches 221*a*, 221*b*, 221*c*, and 221*d* corresponding to the second pixel may be controlled in the off state. The fourth NOR gate 279 may receive the output of the third NOR gate 275 and a signal to which the S_EN signal is switched by a second inverter 278, and output the S_ENI2 signal. When the output of the fourth NOR gate 279 is high (H), the main switches 222*a*, 222*b*, 222*c*, and 222*d* corresponding to the second pixel may be controlled in the on state. On the contrary, when the output of the fourth NOR gate 279 is low (L), the main switches 222*a*, 222*b*, 222*c*, and 222*d* corresponding to the second pixel may be controlled in the off state.

Referring to FIGS. 3A, 3B, and 3C described above, each source amplifier may be connected to four subpixels corresponding to each pixel. In this case, to check whether four source amplifiers corresponding to four subpixels included in each pixel have the error, one comparator 262 and one D-flipflop 263 may be required. As compared with FIGS. 2A, 2B, and 2C described above, the numbers of comparators and D-flipflops are reduced to reduce the size of the display driving device (e. g., the source driver).

Further, referring to FIGS. 3A, 3B, and 3C described above, whether four subpixels corresponding to each pixel have the error is checked to accurately recognize the error of each of the sub pixels. On the contrary, in the aspects of FIGS. 2A, 2B, and 2C, as output voltages (e.g., data voltages) of two subpixels are compared with each other, when all of two subpixels have the errors, a wrong test result may also be output. Moreover, the output voltage of each source amplifier is compared with the reference voltage to variously set the reference voltage. For example, the reference voltage is variously set to first voltage, second voltage, and third voltage which are different and compared with the output voltage of each source amplifier to enhance the reliability of the test.

Figure 4A:
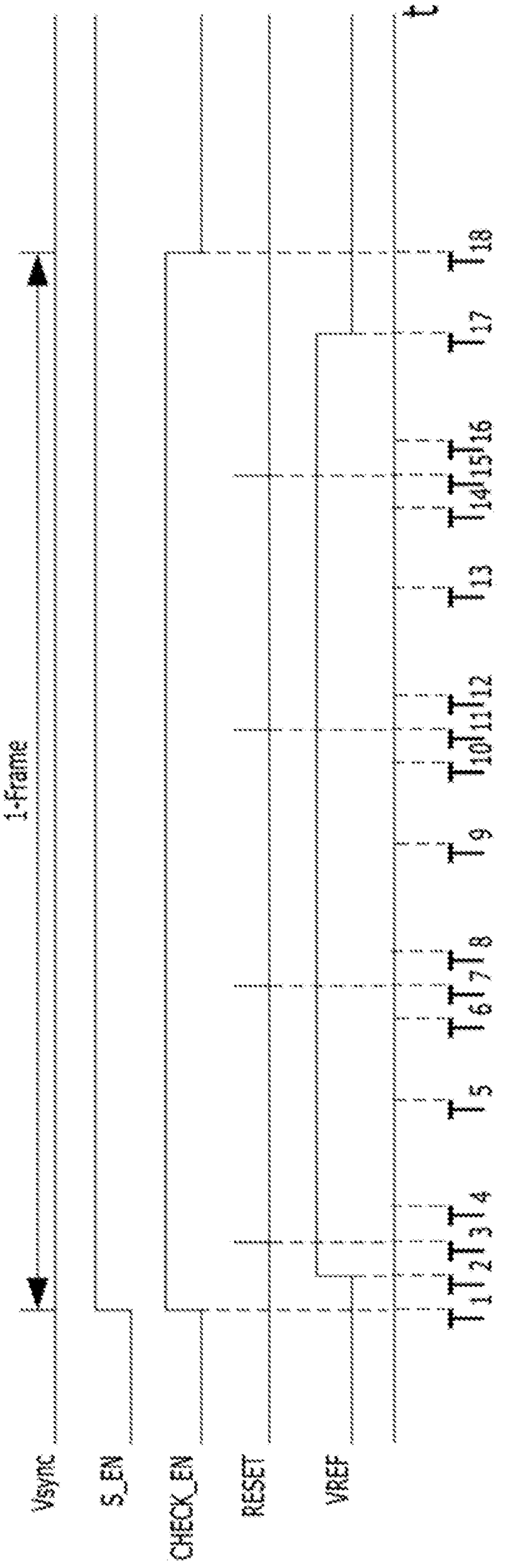
FIG. 4A is a timing diagram corresponding to a normal state of the display driving device according to an aspect of the present disclosure.
Figure 4B:
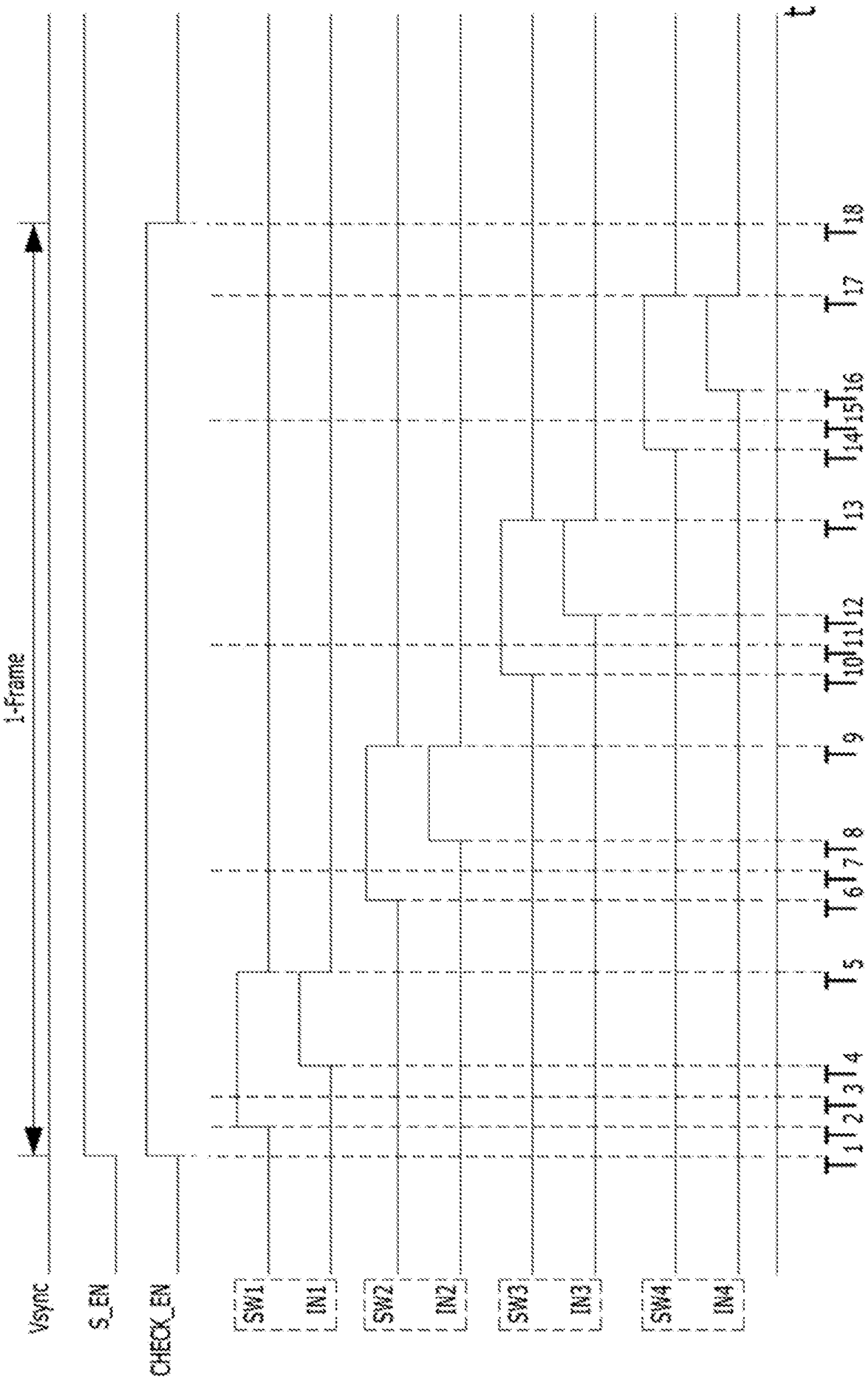
FIG. 4B is a timing diagram corresponding to the normal state of the display driving device according to an aspect of the present disclosure.
Figure 4C:
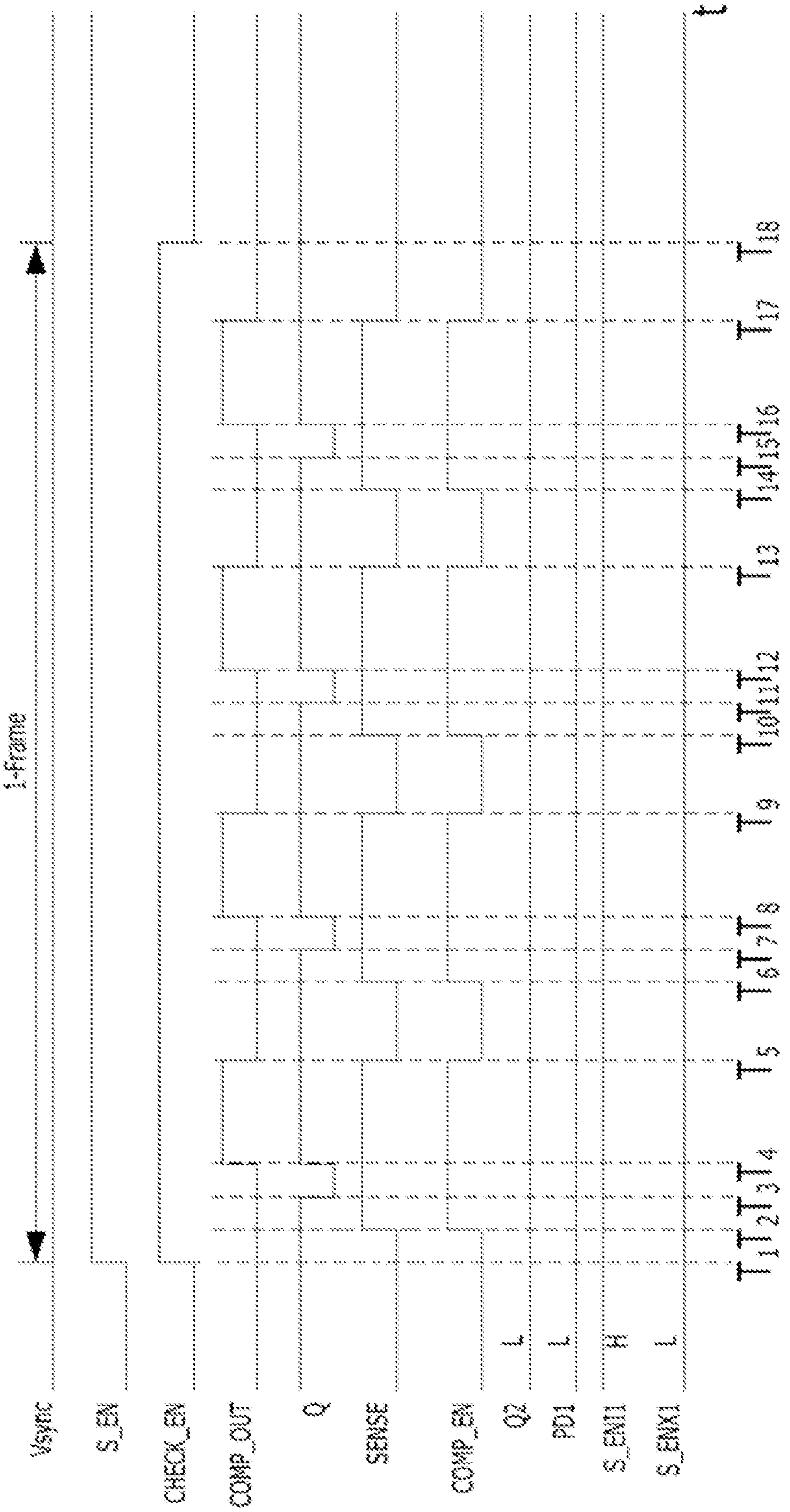
FIG. 4C is the timing diagram corresponding to the normal state of the display driving device according to an aspect of the present disclosure.

FIG. 4A is a timing diagram corresponding to a normal state of the display driving device according to an aspect. FIG. 4B is a timing diagram corresponding to the normal state of the display driving device according to an aspect. FIG. 4C is the timing diagram corresponding to the normal state of the display driving device according to an aspect.

Referring to FIG. 4A, the test mode may be performed in one frame interval. For example, Vsync is synchronized with each frame to distinguish one frame. S_EN may be switched to the high (H) signal according to a synchronization signal of the Vsync. The CHECK_EN signal as a signal corresponding to the test mode may maintain the high (H) state during one frame interval (e.g., T1 to T18) in which the test mode is conducted. A RESET signal may be a reset signal input into a D-flipflop at the test time point of each source amplifier. VREF may be input into the inversion terminal of the comparator during the test mode.

Referring to FIG. 4B, according to an aspect, signals SW1, SW2, SW3, and SW4 may be sequentially in the high state during a test interval of the relevant source amplifier to sequentially turn on respective comparator switches 214*a*, 214*b*, 214*c*, and 214*d*. The source voltages IN1, IN2, IN3, and IN4 may be applied to the non-inversion terminal of each source amplifier in the test interval of the relevant source amplifier.

Referring to FIG. 4C, it may be identified that a COMP_OUT signal shows high during the test interval of each source amplifier as all of four source amplifiers are in the normal state. As all of four source amplifiers are identified to be in the normal state, Q2, PD1, and S_ENX1 may maintain the low (L) signal and the S_ENI1 may maintain the high (H) signal.

Figure 5A:
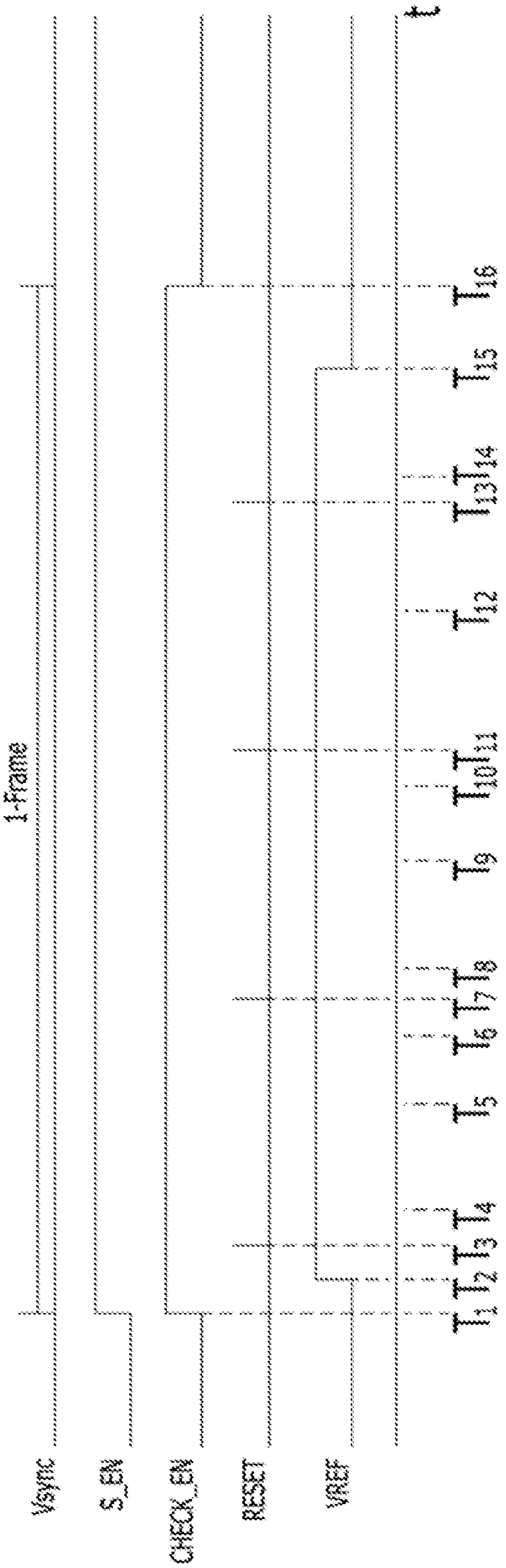
FIG. 5A is a timing diagram corresponding to an error state of the display driving device according to an aspect of the present disclosure.
Figure 5B:
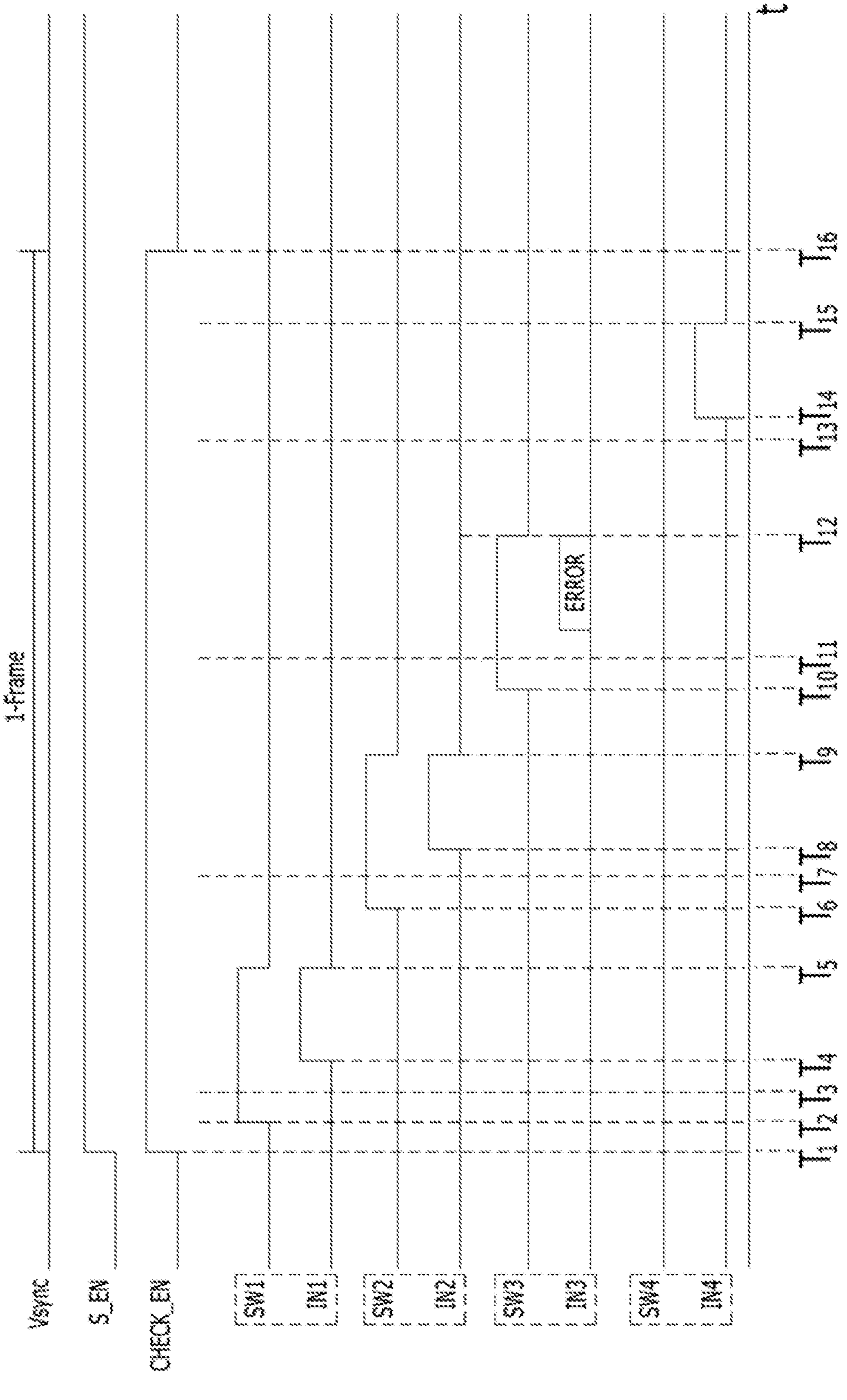
FIG. 5B is the timing diagram corresponding to the error state of the display driving device according to an aspect of the present disclosure.
Figure 5C:
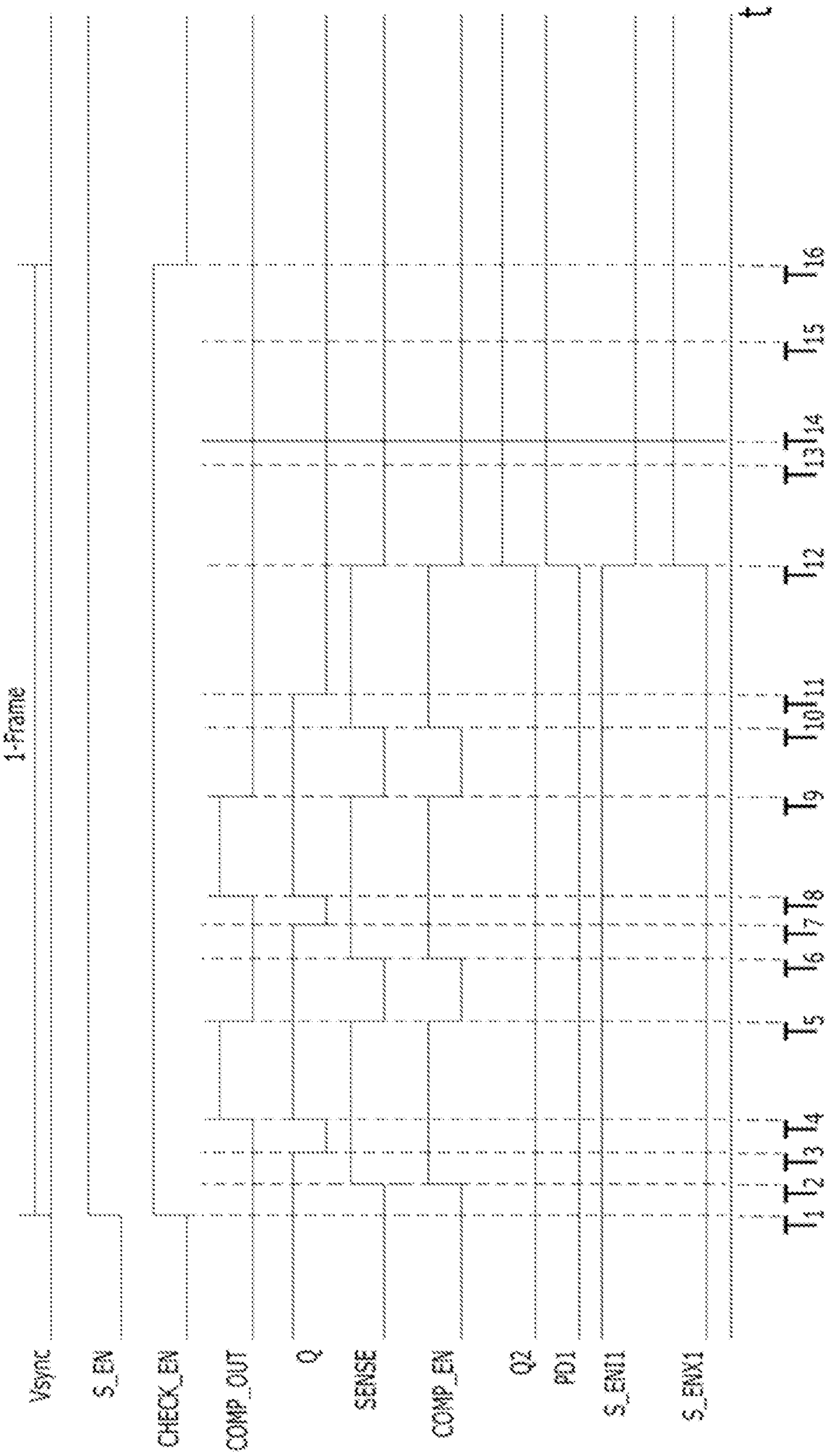
FIG. 5C is the timing diagram corresponding to the error state of the display driving device according to an aspect of the present disclosure.

FIG. 5A is a timing diagram corresponding to an error state of the display driving device according to an aspect. FIG. 5B is a timing diagram corresponding to the error state of the display driving device according to an aspect. FIG. 5C is the timing diagram corresponding to the error state of the display driving device according to an aspect.

Referring to FIG. 5A, the test mode may be performed in one frame interval. For example, Vsync is synchronized with each frame to distinguish one frame. S_EN may be switched to the high (H) signal according to a synchronization signal of the Vsync. The CHECK_EN signal as a signal corresponding to the test mode may maintain the high (H) state during one frame interval (e.g., T1 to T18) in which the test mode is conducted. A RESET signal may be a reset signal input into a D-flipflop at the test time point of each source amplifier. VREF may be input into the inversion terminal of the comparator during the test mode.

Referring to FIG. 5B, according to an aspect, signals SW1, SW2, and SW3 may be sequentially in the high state during a test interval of the relevant source amplifier to sequentially turn on respective comparator switches 214*a*, 214*b*, and 214*c*. As compared with FIG. 4B, when it is identified that the 1-3$^{rd}$ source amplifier is in the error state, the signal SW4 maintains the off state to control not to identify whether the 1-4$^{th}$ source amplifier has the error.

Referring to FIG. 5C, it may be identified that the COMP_OUT signal shows high only during the test intervals of the 1-1$^{st}$ source amplifier and the 1-2$^{nd}$ source amplifier as it is identified that the 1-3$^{rd}$ source amplifier is in the error state. As it is identified that the 1-3$^{rd}$ source amplifier is in the error state, Q2, PD1, and S_ENX1 may be converted from the low (L) signal to the high (H) signal, and the S_ENI1 signal may be converted from the high (H) signal to the low (L) signal, at the time point of identifying the error state of the 1-3$^{rd}$ source amplifier. As such, when it is identified that a specific source amplifier has the error, the error may be corrected by changing a path of the source amplifier in the same frame.

According to an aspect, referring to FIG. 4C or 5C, the COMP_EN signal maintains the high (H) signal only during a comparison interval, which allows the amplifier (e. g., the first comparator 262 or the second comparator 272) used as the comparator operate only at a scan time. As such, the amplifier operates only at the scan time to reduce power consumption of the source driver.

Figure 6:
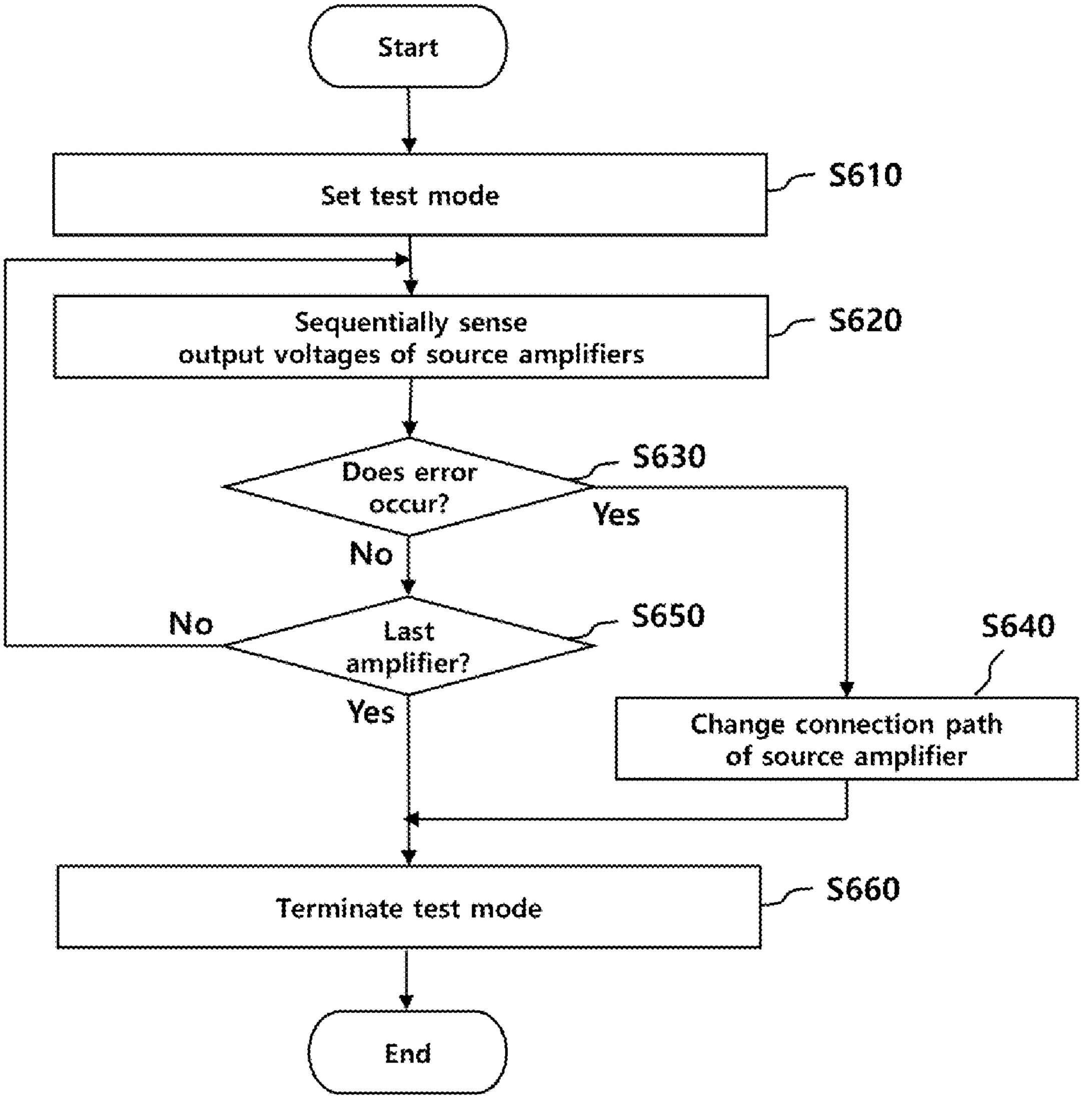
FIG. 6 is a flowchart illustrating a method for determining an error of a source amplifier of the display driving device according to an aspect of the present disclosure.

FIG. 6 is a flowchart illustrating a method for determining an error of a source amplifier of the display driving device according to an aspect.

Referring to FIG. 6, a display driving device (e.g., source driver) may set a test mode as a power supply is in an on state (S610).

The display driving device may sequentially sense output voltage (e.g., data voltage) of each source amplifier within a relevant frame in which the test mode is set (S620).

When it is identified that a specific source amplifier has an error (S630), the error may be corrected by changing a connection path of the relevant source amplifier to a channel circuit of an adjacent pixel within the same frame (S640).

As the error of the source amplifier for the relevant pixel is corrected, a test mode may be terminated without continuously determining whether a source amplifier corresponding to a next subpixel within a relevant pixel has the error (S660).

On the contrary, when it is identified that the specific source amplifier does not have the error (S630), output voltage (e.g., data voltage) of a next source amplifier is sensed to continuously identify whether the next source amplifier has the error. When even a last source amplifier is determined to be in a normal state (S650), the test mode may be terminated without changing the connection path of the source amplifier (S660).

As described above, according to an aspect, the output voltage (e. g., data voltage) of the output buffer (e. g., source amplifier) corresponding to each pixel (e. g., subpixel) is sequentially compared with the reference voltage to check the error of the output buffer, thereby reducing the number and sizes of elements used for checking the error.

Further, according to an aspect, the output voltage (e. g., data voltage) of the output buffer (e. g., source amplifier) corresponding to each pixel (e. g., subpixel) is sequentially compared with the reference voltage to check the error of the output buffer and the error is repaired in the same frame, thereby reducing the time required for error inspection and repairing.

It will be apparent to those skilled in the art that various modifications and variations can be made in the display driving device and a method for determining an error of a source amplifier in the display driving device of the present disclosure without departing from the spirit or scope of the aspects. Thus, it is intended that the present disclosure covers the modifications and variations of the aspects provided they come within the scope of the appended claims and their equivalents.

What is claimed is:

1. A display driving device comprising:

a first source amplifier configured to receive first source voltage corresponding to a first gray value and output first data voltage;

a first channel circuit configured to supply the first data voltage output from the first source amplifier to a first data line;

a determination circuit configured to determine whether an error occurs by comparing the first data voltage output from the first source amplifier and reference voltage; and a switching circuit configured to connect an output line of the first source amplifier to any one channel circuit of the first channel circuit and a second channel circuit connected to a pixel adjacent to a pixel of the first channel circuit, based on a determination result of the determination circuit.

2. The display driving device of claim 1, wherein a subpixel corresponding to a second source amplifier connected to the second channel circuit is a subpixel having the same color as a subpixel corresponding to the first source amplifier.

3. The display driving device of claim 1, wherein the switching circuit switches the output line of the first source amplifier from the first channel circuit to the second channel circuit when it is identified that the first source amplifier has the error according to the determination result of the determination circuit.

4. The display driving device of claim 3, wherein a switching operation from the first channel circuit to the second channel circuit is performed in a frame which is the same as a frame in which an operation of determining the error of the first source amplifier is performed.

5. The display driving device of claim 1, wherein the determination circuit includes a comparator configured to compare the first data voltage output from the first source amplifier with the reference voltage.

6. The display driving device of claim 5, wherein the determination circuit includes a D-flipflop configured to receive an output of the comparator and outputting a delayed signal.

7. The display driving device of claim 1, wherein the determination circuit is configured to sequentially determine whether each source amplifier has the error by sequentially comparing data voltages output from source amplifiers corresponding to a plurality of subpixels included in one pixel, respectively with the reference voltage.

8. The display driving device of claim 7, wherein the determination circuit is configured to stop a test operation for the source amplifier when an error for a specific subpixel among the plurality of subpixels is identified.

9. The display driving device of claim 1, wherein when it is identified that the first source amplifier has the error according to the determination result of the determination circuit, power supplying to the first source amplifier is interrupted.

10. The display driving device of claim 1, wherein the switching circuit switches output lines of other subpixels in a pixel including a subpixel corresponding to the first source amplifier to channel circuits of adjacent subpixels when it is identified that the first source amplifier has the error according to the determination result of the determination circuit.

11. A method for determining an error of a source amplifier of a display driving device, the method comprising:

receiving, by a first source amplifier, first source voltage corresponding to a first gray value and outputting first data voltage;

supplying the first data voltage output from the first source amplifier to a first data line through a first channel circuit;

determining, by a determination circuit, whether an error occurs by comparing the first data voltage output from the first source amplifier and reference voltage; and switching an output line of the first source amplifier from the first channel circuit to a second channel circuit when it is identified that the first source amplifier has the error according to a determination result of the determination circuit.

12. The method of claim 11, wherein the second channel circuit is connected to a subpixel corresponding to a second source amplifier that has a same color as a subpixel corresponding to the first source amplifier.

13. The method of claim 11, wherein the switching the output of the first source amplifier from the first channel circuit to the second channel circuit is performed in a frame which is the same as a frame in which an operation of determining the error of the first source amplifier is performed.

14. The method of claim 11, wherein the determining the error of the source amplifier is sequentially determined whether each source amplifier has the error by sequentially comparing data voltages output from source amplifiers corresponding to a plurality of subpixels included in one pixel, respectively with the reference voltage.

15. The method of claim 14, wherein the determining the error of the source amplifier is stopped when an error for a specific subpixel among the plurality of subpixels is identified.

16. The method of claim 11, further comprising interrupting power supplying to the first source amplifier when the first source amplifier has the error according to the determination result of the determination circuit.

17. The method of claim 11, further comprising switching output lines of other subpixels in a pixel including a subpixel corresponding to the first source amplifier to channel circuits of adjacent subpixels when the first source amplifier has the error according to the determination result of the determination circuit.

18. A display driving device comprising:

a first source amplifier configured to receive first source voltage corresponding to a first gray value and outputting first data voltage;

a first channel circuit configured to supply the first data voltage output from the first source amplifier to a first data line;

a second source amplifier configured to receive second source voltage corresponding to a second gray value and outputting second data voltage;

a second channel circuit configured to supply the second data voltage output from the second source amplifier to a second data line;

an amplifier configured to output reference voltage set based on a control signal;

a determination circuit configured to determine whether an error occurs by comparing the first data voltage output from the first source amplifier and the reference voltage output from the amplifier; and a switching circuit configured to connect an output line of the first source amplifier to any one channel circuit of the first channel circuit and the second channel circuit based on a determination result of the determination circuit.

19. The display driving device of claim 18, wherein a subpixel corresponding to the second source amplifier is a subpixel having the same color as a subpixel corresponding to the first source amplifier.

20. The display driving device of claim 18, wherein the switching circuit switches the output line of the first source amplifier from the first channel circuit to the second channel circuit when it is identified that the first source amplifier has the error according to the determination result of the determination circuit.

* * * * *